United States Patent [19]

Swett et al.

[11] 4,023,482
[45] May 17, 1977

[54] PRINTING OF AUTOMATICALLY READABLE CHARACTERS

[75] Inventors: Robert W. Swett, Smoke Rise, N.J.; Amnon Goldstein, Manhasset, N.Y.; Edward C. Marshall, Upper Montclair; Paul E. Stanford, Clifton, both of N.J.

[73] Assignee: Litton Business Systems, Inc., Belleville, N.J.

[22] Filed: Sept. 23, 1974

[21] Appl. No.: 508,677

[52] U.S. Cl. .................. 101/19; 101/21; 101/26; 101/27; 101/29; 101/30; 101/31
[51] Int. Cl.² .......................... B44B 5/00
[58] Field of Search ............ 101/32, 31, 30, 27, 101/25, 26, 19, 21, 110; 235/61.12 R

[56] References Cited

UNITED STATES PATENTS

| | | | |
|---|---|---|---|
| 3,155,031 | 11/1964 | Ingves et al. | 101/19 |
| 3,170,390 | 2/1965 | Wagner | 101/19 |
| 3,223,033 | 12/1965 | Sundblad | 101/110 X |
| 3,247,784 | 4/1966 | Condy et al. | 101/19 |
| 3,390,629 | 7/1968 | Parenti et al. | 101/19 |
| 3,531,628 | 9/1970 | White | 235/61.12 R |
| 3,613,570 | 10/1971 | Gladen | 101/31 X |
| 3,726,272 | 4/1973 | Combs | 101/21 |
| 3,730,081 | 5/1973 | Colledge | 101/31 X |

Primary Examiner—Edward M. Coven
Attorney, Agent, or Firm—Norman Friedman; Robert F. Rotella

[57] ABSTRACT

Hot printing of hard copy i.e., human readable, characters to meet the strict, high quality dimensional and other standards required for automatic optical or other means of reading such characters. The printing is effected by a heat responsive ink means. In the present embodiment, the ink means is heated by the printing members.

Documents, especially tags or labels, marked with such hot printed automatically readable characters. The documents may also contain punched encoded information; and may further have printed thereon conventional, human but not automatically readable characters.

20 Claims, 13 Drawing Figures

PRINTING OF AUTOMATICALLY READABLE CHARACTERS

BACKGROUND OF THE INVENTION

1. Field of the Invention

This application relates to printing of hard copy i.e., human readable, characters to the high quality printing standards required for automatic optical or other reading of such characters. (As used herein, the term "automatic reading" is intended to include not only readers in which the document is fed through the reader, but also hand held wand-type readers which are manually drawn across the document.) More particularly, it relates to the printing of such characters on conventional paper stock, such as is used for tags and labels, and especially in machines of the type where the printing action is of the squeeze, low impact type rather than the high kinetic energy, high impact type as occurs for example in a typewriter.

In the former, i.e., squeeze, type of printing when done on conventional paper stock, it has been found difficult to obtain the high quality, very accurate printing needed for automatic reading of the characters.

The present invention relates to printing such high quality automatically readable characters on paper tag and label stock by a heat responsive ink material, for example an ink ribbon of the hot foil stamp type.

2. Description of the Prior Art

The hot stamp printing technique using a foil ribbon is exemplified by the following U.S. Pat. Nos. 3,022,724; 3,097,592; 3,244,092; 3,301,370; and 3,430,557. However, such prior art devices employ hot stamp printing for an entirely different purpose and in an entirely different environment from the present invention. As indicated in these patents, they are for the typical purpose of printing on very smooth, glossy, non-fibrous, plastic surfaces, one example being for printing on a smooth plastic film. Because of the glossy and non-porous nature of such materials, it is extremely difficult to print on them. They are essentially non-wettable by and non-adhesive with usual printing inks. The hot stamp technique is one of the few practical ways of printing conventional information on such surfaces. The hot stamp technique is also used for printing on extremely rough surfaces such as fabric; and where special decorative effects such as metallic printing are desired.

U.S. Pat. No. 2,351,073 discloses a carbon paper which is non-smudging at ambient temperatures. In use, the carbon paper is fed around the typewriter platen, and is heated just before it arrives at the platen. While still hot, it is operated on by the type bars, and then subsequently cools back to its normal ambient non-smudging state.

U.S. Pat. No. 3,726,212 relates to thermally printing a non-smudging, three-color bar code representative of a character, but not the character itself.

SUMMARY OF THE INVENTION

The present invention provides for printing of human readable characters which are also automatically readable, especially by optical hand held reader means, to the very high quality standards required for such automatic reading. The standards for the printing of such characters are extremely demanding. Typically, they require the character contour to be sharply and accurately defined within a tolerance in the order of 0.003 inches, and also require that the printed ink layer defining the character be laid down uniformly and with a minimum of voids. Such standards are strict when the document is automatically fed through the character reader. But, they are even stricter when the printed hard copy characters on the document are to be automatically read by a hand held wand-type of device which is manually drawn across the document, which may be a tag at a point of sale checkout counter in a store. There is a chance for increased reading error in the latter hand held type of reader, since different operators may hold the reading wand at different angular positions when reading the tag. In fact, they are likely to vary the reading angle in the course of a single reading stroke across the tag.

One typical set of standards for such characters is the "American National Standard Character Set and Print Quality for Optical Character Recognition (OCR-A)" published by the American National Standards Institute (ANSI).

The present invention provides for the printing of such automatically optically readable characters on a tag, ticket, label, or other document made of the conventional paper stock of which such documents are normally made. The printing is done by a hot printing, preferably a hot stamp technique, which has been found to print with the required sharpness and quality to meet the foregoing automatic character reading requirements.

In the specific exemplary embodiment disclosed herein, the machine includes at least one, and preferably several banks of printing members, such as wheels, bearing the appropriate type faces for printing the automatically readable characters. The wheels are differentially adjustable for selection of a given one of a number of type faces thereon for printing. Printing is done from a heat responsive hot stamp foil ink ribbon. It is of the type which is ineffective at normal ambient temperatures to print the automatically readable characters. However, when the ink on the ribbon is brought to elevated temperatures, the characters printed therefrom meet the strict standards for automatic character reading. The printing wheels are heated to the appropriate printing temperature, preferably by a heating element means mounted in the hubs on which the wheels rotate.

It is a primary object of the present invention to print automatically readable human readable characters by use of a hot printing technique.

It is a further object to provide such printing by the use of a hot stamp foil ribbon.

It is a further object to provide such printing wherein the printing wheels are heated to the appropriate printing temperature to thereby heat the printing ribbon.

It is a further object to provide such printing wherein the printing wheels are mounted on a relatively large stationary hub which is heated to thereby heat the printing wheels.

It is a further object to provide a document, such as tag or label, on which have been marked by a hot printing technique characters which are both human and automatically readable.

It is a further object to provide such a document which also contains markings in the form of encoded punched hole arrangements.

It is a further object to provide such a document which also contains conventional printed characters which are not automatically readable.

The above and other objects, advantages, and features of the invention will become apparent to those skilled in the art from the following detailed description of a specific embodiment of the invention when read in conjunction with the accompanying drawings, in which:

DETAILED DESCRIPTION OF A SPECIFIC EMBODIMENT

There will now be described a specific embodiment of the invention, as incorporated in a print-punch machine as disclosed in U.S. Pat. No. 2,708,873 in the name of K. J. Braun and assigned to a predecessor company of the present assignee. That machine marks information on small documents commonly known as tags or tickets, by printing and punching, the latter being in the form of encoded arrangements of punched holes. This system is widely used throughout the world, particularly in department stores and discount stores, and in all manner of commercial establishments. To various articles for sale in a store, there is affixed in any suitable fashion a tag of this type. The tag may be a one-part tag, or a plural-part tag where each of the plural parts has identical information marked thereon. The information marked on each such tag will usually include the price, a stock classification number uniquely identifying the particular article of merchandise, and any other appropriate information that is desired to be put on the tag.

Since the price is imprinted thereon, the tag thereby serves as the price tag for the article to which it is affixed. The other printed hard copy information, such as classification number and other control information, can also be visually read. Furthermore, since the tags also contain the information in the form of the encoded punched hole arrangements, the tags can be and are subsequently processed in data processing equipment, including automatic reading equipment for reading the punched information from the tags, to generate sales reports, inventory control information, etc.

It has recently been proposed that the foregoing type of tag, rather than having the information marked on it in two languages — human readable printing and automatically readable punched encoding — instead have the information imprinted thereon in human readable characters which are also capable of being read by optical character recognition equipment including hand held wand readers. Such characters are conventionally known in the art as OCR characters. [Alternative variations of the foregoing are to have the tag marked with both the OCR characters and the punched encoding; or these two languages plus conventional, non-OCR, visually readable characters.]

The present specific embodiment of the invention, involves modification of the existing print-punch machine of the type of the aforementioned Braun patent. As pointed out earlier, the print-punch system including and in which such machine is used has found wide acceptance and is extensively used throughout the world. It is marketed by Kimball Systems. Modification of this machine to provide that the hard copy or human readable characters it prints are also OCR characters enables users of the system to make the transition to the new proposed OCR tag printing with a minimum of change in existing procedures. The print-punch machine as modified herein will punch and print the information as before, but the printed information will be in the form of the OCR characters capable of being automatically read. Therefore, users who wish to continue using the system in its present way will merely continue to do so. The difference will be that the printed characters will now be OCR characters rather than the conventional type face heretofore used. However, those users who desire to immediately commence using an OCR reading and data processing system will be immediately able to do so since the printing information on the tags is printed in the automatically readable OCR type font.

However, it should be noted that the principles and features of the invention are not restricted to use in a print-punch machine, whether of the aforementioned Braun type or otherwise. Rather, they are applicable to and susceptible of use in any desired type of printing machine, including machines intended only for printing and which do not include any provision for also providing the information in punched hole form. Of course, the principles of the invention are also applicable to print-punch machines other than those of the type shown in the Braun patent, e.g., a print-punch machine of the type shown in U.S. Pat. Nos. 2,890,650 and 2,968,236.

It should also be understood that since the invention relates to the printing of characters to the extremely high standards required for optical character recognition including hand-held wand reading, the invention is also applicable to the printing of other kinds of automatically readable, hard copy characters, which must also be printed to strict high quality standards. One example of these is magnetic ink characters recognition characters, also known as MICR characters.

The Prior Art Print-Punch Machine

There will now be described only so much of the prior art machine of Braun U.S. Pat. No. 2,708,873 as is necessary for an understanding of the operation of the overall machine and of the relationship between the present novel structure and the prior machine structure.

As generally discussed earlier and as will be described in detail later, the present machine involves modification of the printing mechanism to provide for hot printing of OCR characters, preferably from a heat responsive foil ribbon.

Reference is made to the aforementioned U.S. Pat. No. 2,708,873 for a full, detailed disclosure of the prior art print-punch machine in which the present invention is embodied.

Figure 1:
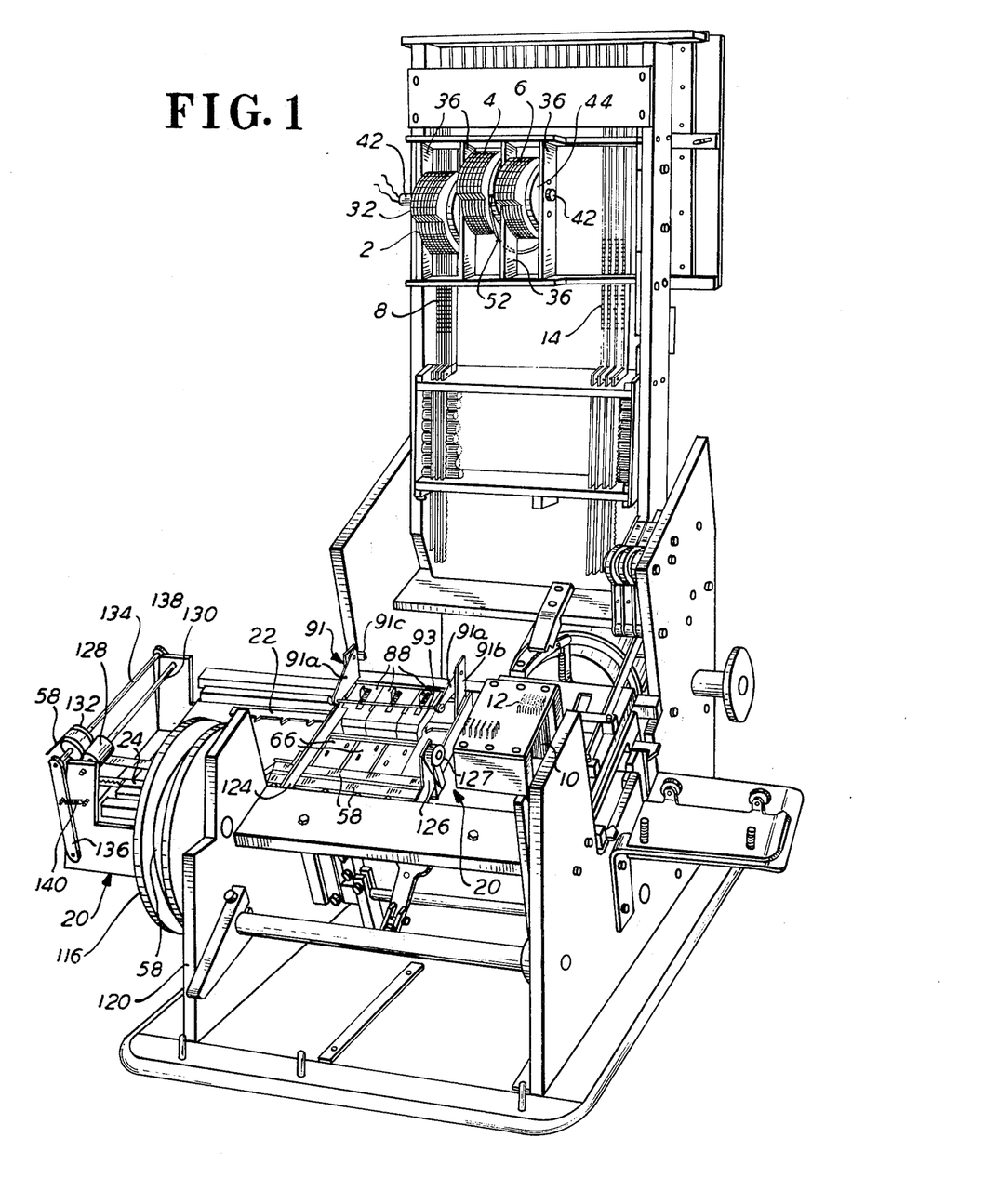
FIG. 1 is a front perspective view of a tag-marking print-punch machine of the invention, the upper portion of the machine carrying the printing wheels being in raised, swung-back position.

Referring to FIG. 1, the machine includes printing mechanism and punching mechanism. The printing mechanism include banks of printing wheels 2, 4, and 6. The wheels of each such bank are mounted for independent rotation about a common horizontal axis. Each such axis is appropriately positioned in a fore and aft sense so that the corresponding bank of wheels will print on a different desired line of the tags. Each printing wheel is adapted to be rotatably set for selection of a given type face thereon for printing, by a corresponding overlying rack 8 whose teeth are engageable with pinion teeth formed along a portion of the wheel's periphery.

The punching means includes a number of punches 10 and a like number of associated overlying interponent pins 12, both arranged in appropriate desired rows and columns. Which of the punches in each column will be caused to operate, thereby determining what information is punched, is determined by the selected longitudinally adjusted position of a related overlying gag bar 14. Each gag bar is provided with a permutated arrangement of depending lugs overlying the interponent pins 12.

Each printing wheel is adapted to be differentially adjusted or selectively set to print the desired character, by operation of the machine's manual keyboard which includes a series of manually operable setting keys 16 (FIG. 2), one for each wheel to be set. By means of suitable interconnecting mechanism, the setting of the printing wheels also simultaneously causes the gag bars 14 to be moved longitudinally to corresponding set positions, to thereby control the punches 10 to subsequently punch the same information.

The machine, instead of or in addition to having a manually operable keyboard, can be provided with automatic input of the information to be marked on the tags, as shown for example in U.S. Pat. No. 3,755,656.

Figure 5:
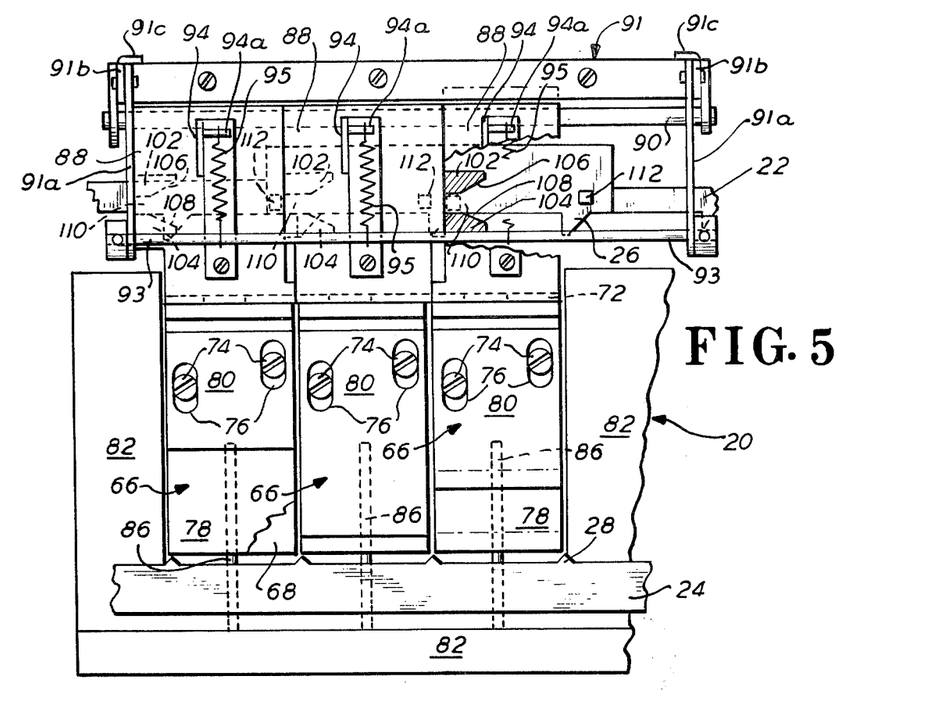
FIG. 5 is an enlarged, fragmentary, top plan view showing the sub-platens and their disabling mechanism.
Figure 7:
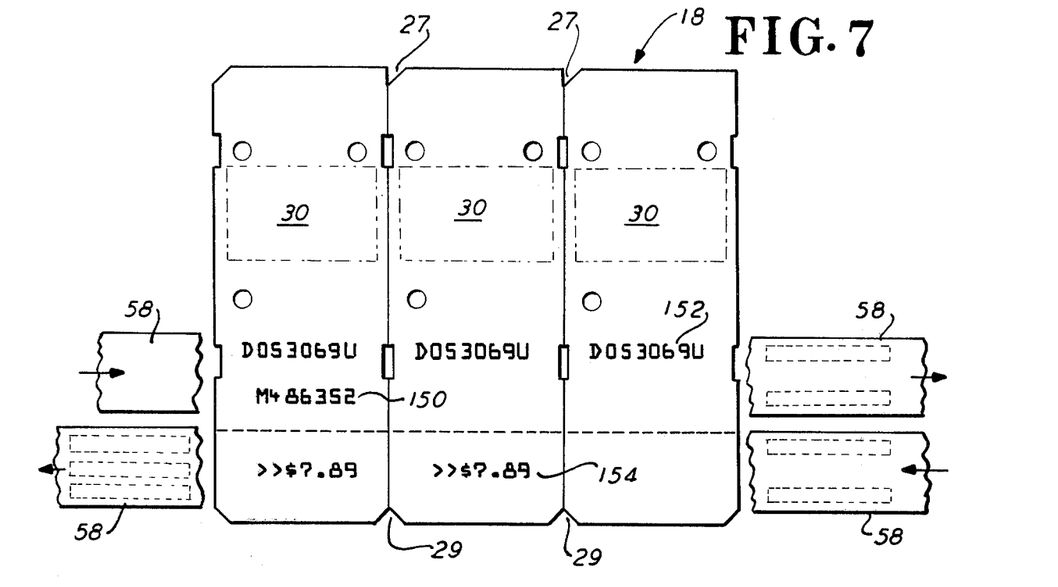
FIG. 7 is a top plan view showing the successive printing operations on different lines of the tag stock web and also the path of movement of the printing ribbon.
Figures 10, 11:
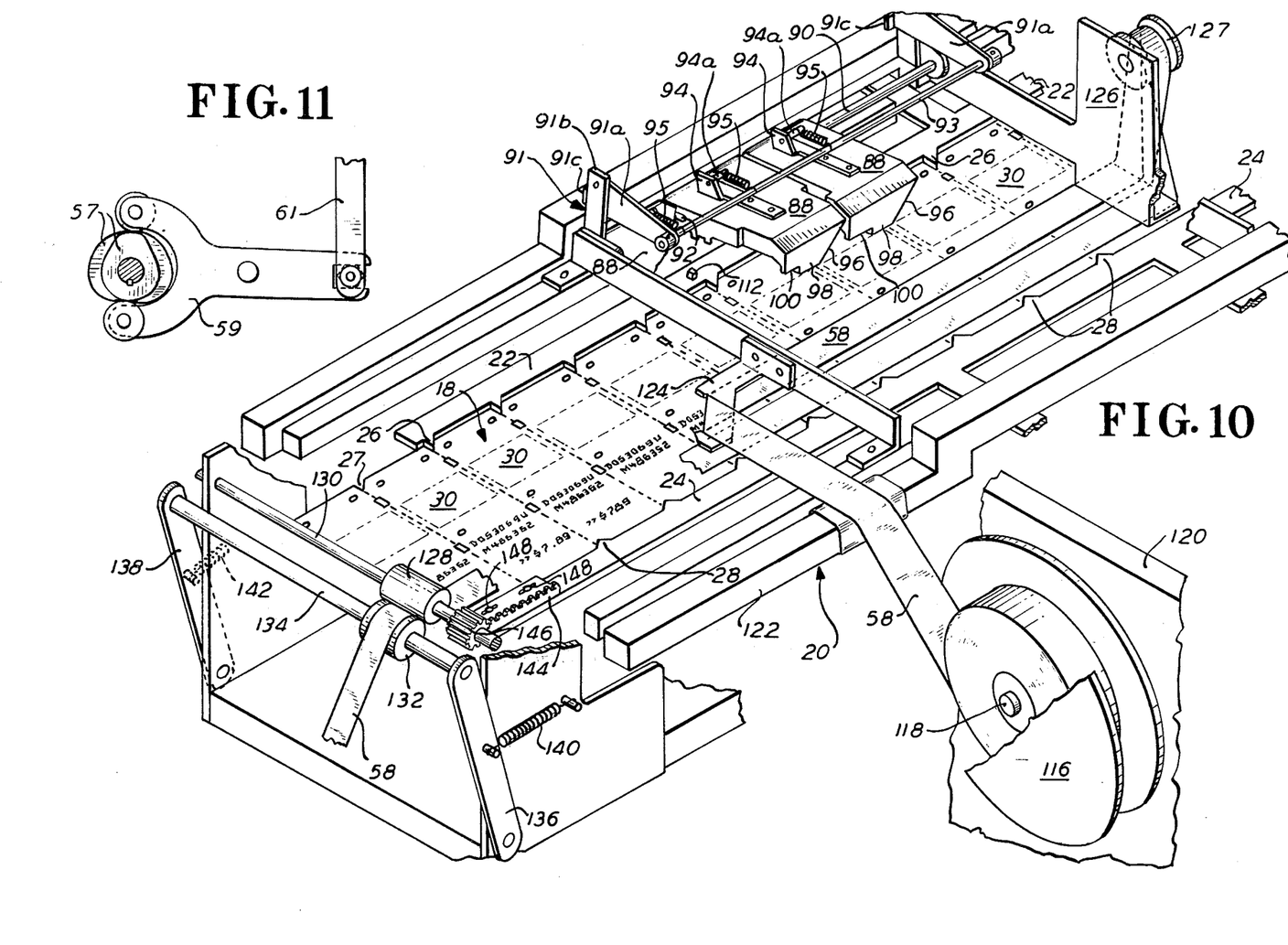
FIG. 10 is a perspective view of the platen carriage area of the machine, showing the sub-platen disabling structure and the ribbon feeding mechanism.
FIG. 11 is a fragmentary detail view of the carriage control cams and linkage.

A web 18 (FIGS. 7, 10) of the tag stock to be punched and printed is fed from right to left through the machine and supported therein on a vertically reciprocatable frame, or platen carriage, generally designated 20. The tag stock 18 is fed by an opposed pair of reciprocating feed arms 22 and 24 (FIGS. 1, 5, 10). The arms are provided with laterally extending triangular shaped feed teeth 26 and 28 adapted to engage in correspondingly shaped feed notches 27 and 29 provided on the opposed longitudinal side edges of the tag web. On each cycle of operation of the machine, a given tag part of the stock web is successively fed through first a punching station and then through successive printing stations where the various respective lines of printing are printed on the tag. The punching and printing operations are caused to occur by virtue of the vertically movable platen carriage or frame 20 cyclically rising from its normal, lowered position to a higher position, thereby carrying the tag stock supported thereon into respective punching and printing squeeze contact with the punches and the print wheels. In FIGS. 7 and 10, the punched area of the tags is shown in broken lines and designated 30.

The machine includes mechanism for cutting the tag stock web 18 into tags having a variably selective number of identical punched and printed tag parts, i.e., a one or more part tag.

In the Braun machine, the ink for printing is provided by a conventional ink ribbon operating at normal ambient temperatures. However, in the present machine, the ribbon is a heat responsive foil ink ribbon, and the printing wheels of the banks 2, 4, 6 are heated to print the OCR characters from the foil ribbon on the conventional paper tag stock 18.

The Hot Printing Mechanism

The mechanism whereby the hot printing of the OCR characters is effected will now be described.

Figure 2:
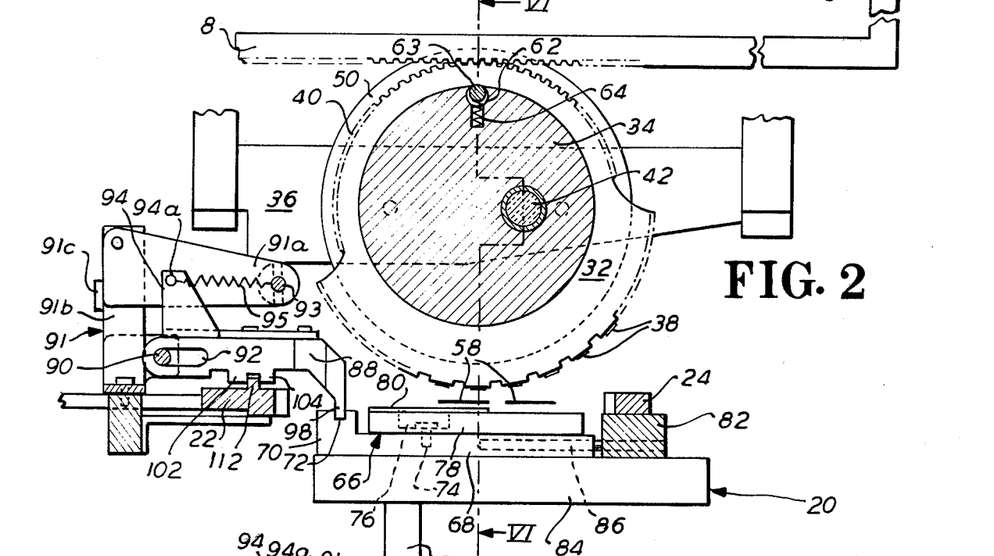
FIG. 2 is a left side, elevational view partially in section showing the printing wheel and platen structure.
Figure 6:
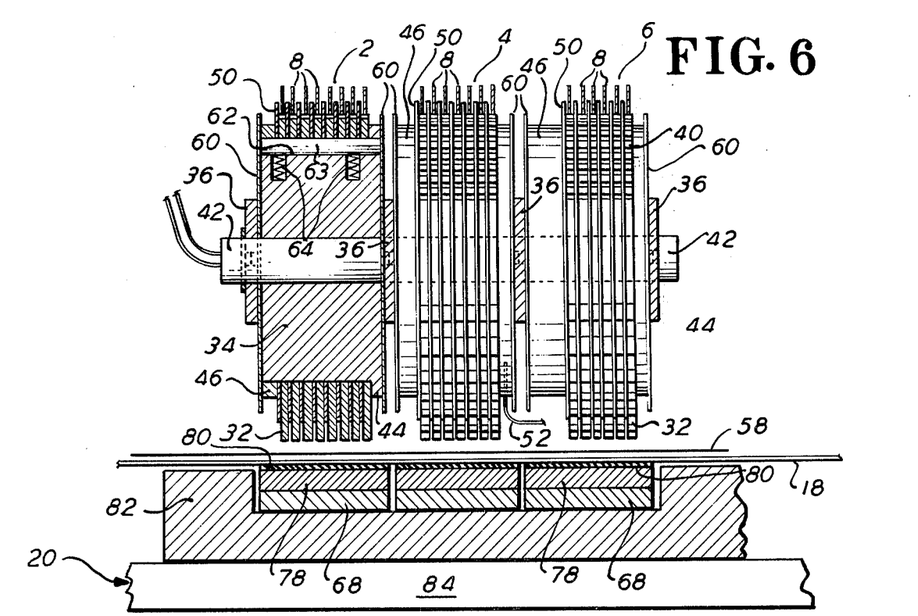
FIG. 6 is a sectional view taken on line VI — VI of FIG. 2.

Referring particularly to FIGS. 2 and 6, each printing wheel 32 is in the form of a radially narrow band or annulus rotatably supported on a relatively large diameter stationary cylindrical hub 34 mounted in any suitable fashion between opposed framing plates 36 of the machine. Each hub 34 carries one bank of the printing wheels, for printing on a given line of the tag. The hubs and wheels are made of material having a high heat conductivity characteristic, such as metal. For example, the hubs may be of steel, or chrome plated brass, and the wheels of steel. Other suitable material may be used.

Each wheel 32 is provided along one periphral portion thereof with the appropriate type faces 38 for printing the OCR characters, which may be alphanumeric as well as symbol characters. It is provided along another peripheral portion with the pinion teeth 40 engageable by the racks 8 for differential rotary setting of the wheels. For the best quality of automatically readable printing, the outer surface of each type face 38 is flat so as to be parallel with the flat platen when printing occurs.

Figure 9:
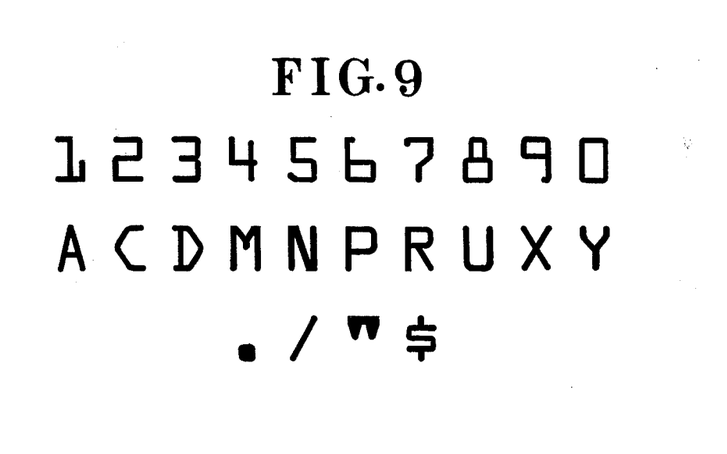
FIG. 9 shows a set of OCR characters.

As is known in the art, OCR and other automatically readable characters are specially configured to be readable by character recognition equipment. FIG. 9 shows one typical set of such OCR characters. Each type face 38 for printing a respective character of the set is correspondingly specially configured.

The cylindrical hubs 34 provide or define the axis about which the wheels 32 mounted thereon rotate. The hubs are relatively positioned in a fore-aft direction so that each bank of wheels will print on a different line of the tags.

The hubs are all heated by a common heating element in the form of an elongated, cylindrical, ceramic core electric resistance heater 42 secured at its ends to the leftmost and rightmost framing plates 36 and extending through closely fitting holes in the hubs 34. The heater also passes through corresponding holes provided in the various framing plates 36.

In the present embodiment, for ease of subassembly of each bank of printing wheels on its hub, each of the latter os provided at one (the right, in this case) end with a slightly enlarged flange 44. The wheels are held spaced in the appropriate lateral positions along the hub by a left, end spacer collar 46 and intermediate thin spacer collars 50. The latter, being of a somewhat larger radius than the uppermost, toothed pinion portion 40 of each wheel, serve to trap or guide each associated wheel-setting rack 8 between each adjacent pair of the thin spacer collars 50.

The heat is transmitted from each heated hub 34 to the bank of printing wheels 32 mounted thereon, including the type faces 38 which are to print the OCR characters.

Figure 8:
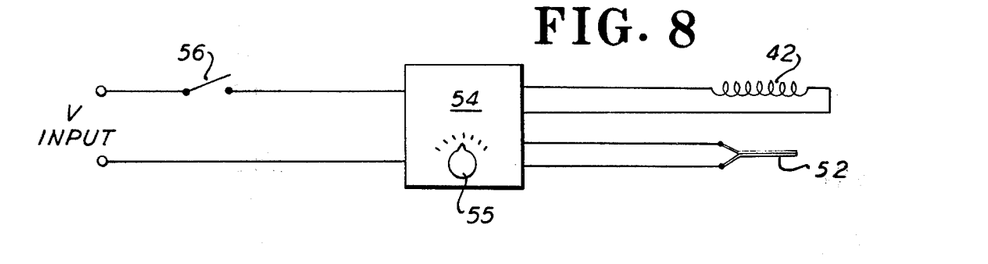
FIG. 8 is a wiring diagram of the printing wheel heater and associated controls.

In the present embodiment, a thermocouple 52 is disposed in a radial hole of flange 44 of the middle hub 34. In known fashion, thermocouple 52 and heater 42 are electrically interconnected through a conventional commercially available control unit 54, as shown in the wiring diagram of FIG. 8. The control unit 54 is of the type that has a manually adjustable temperature control setting 55, to permit adjustable control of the temperature to which the hubs are heated, and therefore the temperature at which printing will be performed. The electrical arrangement is such that whenever the machine is turned on by closure of its manually operable main switch 56, power will be applied to control unit 54 to heat the hubs. Thus, the hubs are at all times being heated, even though the machine is not cycling.

The heat responsive or heat activatable printing ink is preferably provided by a heat responsive hot stamp foil ink ribbon 58 which will not print the OCR characters at normal ambient temperatures, but which will do so at elevated temperatures. Hot stamp foil ink ribbons are commercially available from a number of sources. They customarily basically comprise a foil carrier strip carrying a layer of the heat activatable ink. The foil carrier strip is made of cellophane, "Mylar" (polyethylene terephthalate), or any other one of a number of suitable plastic or other materials.

It will be recalled from the foregoing description that in the Braun print-punch machine of U.S. Pat. No. 2,708,873, the platen carriage 20 is cyclically raised to bring the tab stock 18 supported thereon, the overlying printing ribbon, and the overlying print wheel (i.e. the selected lowermost type face of the print wheel) into intimate contact with one another for printing, as well as for the substantially simultaneous punching operation. This action is a squeeze or pressure action rather than an impact type of action. The vertical cyclic reciprocation of the platen carriage is controlled by cams 57 (FIG. 11) [corresponding to cams 155 of the Braun patent], through cam follower arms 59 connected by links 61 (FIG. 2) to the platen carriage. In the present machine, the total vertical throw of the platen carriage is in the order of 0.170 inches. Under the control of cam 57, the carriage movement is a smoothly accelerating and decelerating harmonic motion, with the velocity approaching zero as the carriage near the top of its stroke moves into squeeze or pressure printing contact with the overlying tag web 18, ribbon 58, and printing wheel 32. The squeeze printing contact continues as the carriage dwells at the top of its stroke for a short time in the order of about 0.045 seconds, and then commences to descend. During the squeeze printing contact, the hot printing wheels heat the heat activatable ribbon to effect printing from the latter of the OCR characters on the tag web.

At present, it has been found that high quality OCR printing can be performed over a hub temperature range from about 150° to about 400° F and a squeeze printing force range of about 2 to about 18 pounds per character. It will of course be understood that the particular temperatures and printing forces to be employed will be chosen depending on the particular hot stamp ribbon 58 used. The temperature differential from the hub interiors to the outer periphery of the printing wheels is slight, being no more than about 5° F.

The stationary hubs 34 are of substantial size and mass. They and the printing wheels 32 are of the relative dimensions shown to scale in FIG. 2. The hubs therefore function as a heat supply or reservoir to maintain the desired printing temperature at the outer periphery of the print wheels 32 where the OCR printing type faces 38 are located. Also, the fact that the massive hubs are stationary whereas the rotating wheels are radially narrow and therefore lightweight bands, means that only relatively small forces are required to rotatably move and stop the wheels. Further, the fact that the hubs are stationary permits the elongated electric heating element 42 to be mounted extending through the hubs at any desired radial point of the latter.

Thin separator sheets 60 of thermal insulating material are disposed between the ends of each hub 34 and the adjacent metal framing plates 36, to minimize heat loss from the hubs to the plates.

The hubs and wheels are so dimensioned that there will be sufficient radial clearance between them for the wheels to slidably rotate on the hubs when the parts are heated to their operating temperatures.

It may be desirable to upwardly urge the printing wheels relative to their hub so that there is no clearance between them at their bottoms. This eliminates the radial clearance gap between these parts. Therefore there is better heat transfer to the lowermost type faces 38, which are the selected faces for printing. Further, when the platen moves upwardly into the squeeze printing position, it will not bang the printing wheels against their hubs, since there is no clearance space between them at their lower portions. For the foregoing purposes, each hub 34 may be provided at its uppermost longitudinal portion with a longitudinal hole 62 (FIGS. 2, 6) which intersects, and therefore opens outwardly through, the hub periphery to define a narrow longitudinal slot in the hub circumference. A longitudinal pin 63 of a slightly larger diameter than the slot width lies within the hole. The pin is spring biassed outwardly by springs 64 mounted within the hub so that the upper portion of the pin's outer surface extends through the slot and engages the inner bearing surfaces of all the print wheels on that hub, and thereby resiliently holds the wheels at all times elevated and therefore in contact with the hubs at the lowermost portions of both.

Prevention Of Ink Buildup By Platen Disablement

In machines of this type, there are times when the machine is cycling — which includes the vertical reciprocatory cycling of the frame or platen carriage 20 — but there will be no tag stock 18 interposed between the printing ribbon 58 and the underlying platen. This will occur when a web of tag stock 18 is first fed into the machine, and the stock is cyclically being fed one tag width to the left first to the punching station and then to each successive printing station (each printing station underlying a corresponding bank of printing wheels). It will also occur when the supply of tag stock is exhausted and the stock is being run out of the machine to the left.

In the prior art machine, such cycling of the machine with no tag stock present at a printing station will merely result in printing on the platen itself. However, the resulting ink left on the platen is fluid at normal ambient temperatures. Therefore, it will be wiped off on the undersides of the subsequently arriving upstream portion of the tag stock web or can be wiped off with a rag after the stock runs out.

However, in the present machine, such printing on the platen in the absence of tag stock may present a more serious problem. The printing material is heat responsive. Therefore, when it is deposited on the relatively cool platen, it will rapidly solidify, and therefore cannot be wiped off on the underside of subsequently arriving tag stock or by a rag. Over a period of time, there will be a buildup of this solid ink on the platen, which will ultimately interfere with proper printing and/or proper feeding of the tag stock.

To prevent the foregoing ink deposition and buildup, the present machine is provided with a number of sub-platens 66, one for each printing station. Each sub-platen is provided with an uppermost effective resilient platen surface whose forward edge terminates just forward of the printing line for that printing station. Forward of that edge, however, the sub-platen has a stepped down or lower surface. If there is tag stock at the particular printing station, the corresponding sub-platen 66 will be in a normal, forward position, with the forward portion of the effective sub-platen surface at the printing line. Thus, printing will occur when the platen carriage 20 is raised. However, if there is no tag stock at the particular station, the sub-platen for that station will have been moved a short distance to the rear — to position its forwardmost, lower surface at the printing line — before the platen is raised to uppermost, printing position. Therefore, at printing time there will now be a sufficient vertical clearance space between the lowermost printing wheel type faces 38 and the underlying ribbon 58 so that the ribbon will not be squeezed against the platen and will therefore not print on the platen.

Each sub-platen 66 comprises a base member 68 having at its rear end an upstanding transverse ledge 70 provided with an upwardly opening transverse slot 72. Secured to base member 68 by a screw and slot connection 74, 76 (FIG. 5) is a plate 78. On the latter's upper surface is adhesively secured a thin strip 80 of any suitable elastomeric platen material, e.g., rubber, having a firm yielding characteristic to provide sharp and uniform printing. Base member 68 and plate 78 may be made of brass and aluminum respectively.

The side-by-side sub-platens 66 are supported for sliding fore and aft movement on a recessed main platen plate 82 which in turn is secured to an underlying bed plate 84 of the platen carriage 20. (Bed plate 84 corresponds to bed plate 146 of U.S. Pat. No. 2,708,873 and is a leftward extension of the latter.) The sub-platens 66 are guided for their fore and aft sliding movement by rerwardly extending pins 86 mounted on platen plate 82 and extending into respective closely fitting longitudinal holes in the sub-platen base members 68.

Figure 4:
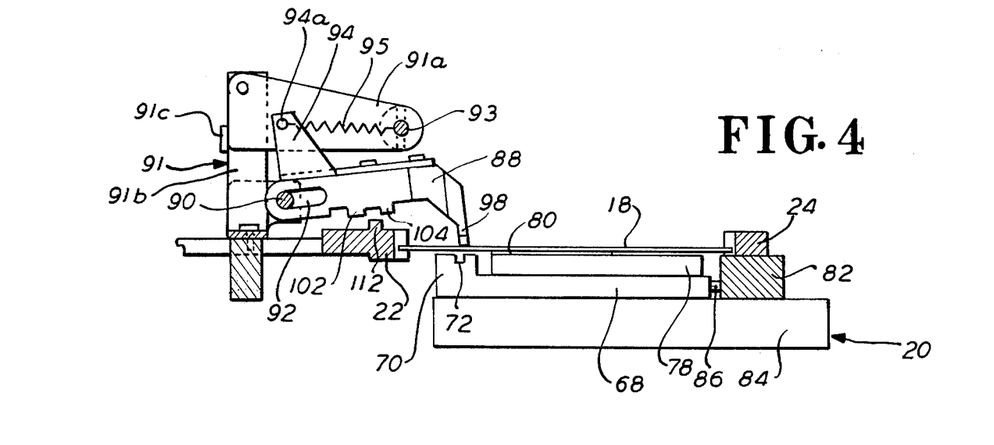
FIG. 4 is a similar view showing a sub-platen in normal, forward, effective position, with the sub-platen disabling mechanism itself in ineffective position.

The forward edge of the upper, rubber strip 80 of each sub-platen 66 lies at or very slightly forward of the forward edge of the printing line for that particular printing station when the sub-platens are in their normal, forward, printing position (FIGS. 2, 4). Since the printing wheels at each printing station print at a different transverse line along the fore-aft axis, the corresponding forward edges of the rubber platen strips 80 similarly lie at different points, as best seen in FIG. 5. The screw and slot connections 74, 76 permit accurate adjustment of the forward edges of rubber strips 80 relative to the overlying printing line of type faces 38.

Figure 3:
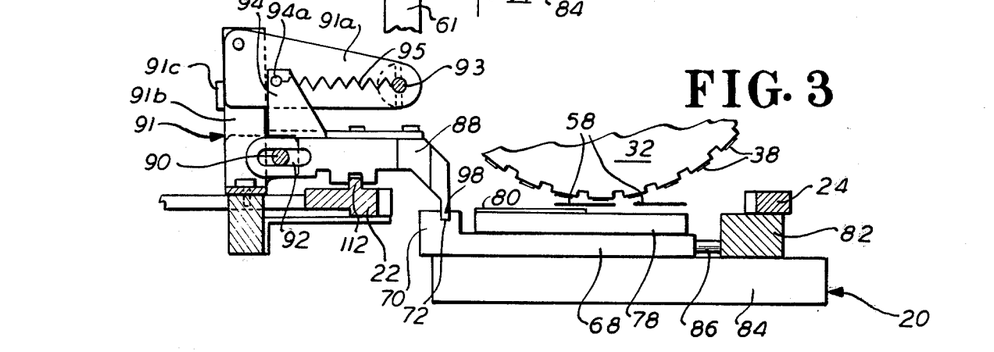
FIG. 3 is a fragmentary view similar to FIG. 2 showing a sub-platen shifted to its rear, disabled position so as to prevent printing on the sub-platen in the absence of tag stock.

If there is no tag stock at a printing station, the sub-platen 66 of that station is disabled by being shifted rearwardly to the position of FIG. 3. Now, a lower step of the sub-platen, defined by the upper surface of plate 78 (rather than the higher, upper surface of rubber strip 80), is in vertical alignment with the overlying printing line of the selected type faces 38 of the related bank of printing wheels 32. Thus, when the sub-platens are shortly thereafter raised to their closest point of approach to the printing wheels, the printing line of the type faces will not press the printing ribbon 58 against the sub-platens; and therefore will not deposit the heat responsive ink from the ribbon onto the sub-platens.

Each sub-platen 66 is pulled backwardly to the just-described disabled position by means of a corresponding puller arm 88, all of which are individually rotatably mounted on a common transverse shaft 90 (FIGS. 2–5, 10) supported on a bracket 91 secured to platen carriage 20. The mounting openings 92 in puller arms 88 by which the arms are mounted on shaft 90 are horizontally elongated to permit the puller arms to also move in a fore-aft direction relative to the shaft 90.

A shaft 93 is supported by the forward ends of the forwardly extending portions 91a of brcket 91, the portions 91a being pivotably supported at their rear on the upstanding bracket portions 91b. Mounted to the top of each puller arm is an upstanding member 94 having a lateral pin 94a. Tension springs 95 connected between pins 94a and shaft 93 urge the puller arms 88 forward on shaft 90, and also downward, i.e., clockwise as viewed from the left. The latter movement is limited by the bracket stop lugs 91c engageable by portions 91b. The pivotal mounting of the latter allows them and also shaft 93 carried thereby, to be swung upwardy, therefore causing like movement of the puller arms through springs 95.

The forward, depending end of each puller arm 88 has the contour shown in FIG. 10, comprising a rightmost downwardly and leftwardly sloping cam edge 96 terminating at a central lowermost horizontal step or lug 98, to the left of which is a cutout 100. Toward its rear, each puller arm 88 is provided at its left underside with two depending, opposed, spaced lugs 102, 104 provided with respective converging cam surfaces 106, 108 leading to a paralled sided opening or slot 110.

The entire aforedescribed puller arm structure may be made as a single, integral molded plastic part.

Adapted to enter the slot 110 of each puller arm 88 is a corresponding rightward one of a series of upstanding square drive pins 112 mounted on the rear tag feed arm 22. The path of movement of the feed arms 22, 24 is a closed loop. It comprises first a leftward feeding movement engaged with the tag stock 18, then a shifting of the feed arms in a fore-aft sense away from the tag stock, then a rightward return movement, followed by finally a fore-aft movement toward the tag stock to once again re-engage the tag stock for leftward feeding of the latter.

The drive pins 112, being fast with the upper feed arm 22, will of course partake of precisely the same loop path of movement. FIG. 5 shows the pins in their normal position at the beginning of a cycle. They will first move directly to the left into underlying vertical alignment with the parallel sided slot 110 of the puller arms 88, as shown by the broken line position of the rightmost pin in FIG. 5. If there is tag stock 18 at a printing station, the stock will hold the puller arm 88 for that station rocked upward in the position of FIG. 4. In this position of the puller arm, the corresponding drive pin 112 will lie below the depending lugs 102, 104 and slot 110 of the puller arm.

However, if there is no stock at the station, the puller arm 88 is thereby free to rock clockwise downwardly under the urge of spring 95 associated therewith. The forward, depending central step or lug 98 of the puller arm now lies within the rear transverse slot 72 of the sub-platen 66 (FIG. 2). Puller arm 88 has therefore now been enabled by being coupled to the sub-platen in driving relation therewith. Further, in this downward position of the puller arm, the lower ends of its depending lugs 102, 104 lie below the top of the related drive pin 112. Therefore, when the drive pin makes its initial leftward shift of movement with the feed arm, it will now move into the puller arm slot 110, and will therefore be in driving relation with the puller arm. The lug will thereafter move to the rear with the tag feeder arm 22, driving the puller arm 88 and therefore also the sub-platen 66 in the same direction (FIG. 3). As described earlier, this rearward movement removes the forward edge of the platen's rubber strip 80 rearwardly from vertical alignment with the printing line of the printing wheels 32. Thus, at printing time the related bank of printing wheels will not press the foil printing ribbon 58 against the sub-platen, and will therefore not print on the latter.

Continuing its cyclic loop movement, the drive pin 112 will then move to the right. As it does, the rearwardly sloping cam surface 106 of the puller arm lug 102 will permit the puller arm tension springs 95 to shift the puller arm and the sub-platen coupled thereto back to their original forward position. For each successive cycle of the machine that there is not tag stock present at that printing station, the foregoing operations will be repeated to prevent printing on the platen. However, when the leading edge of the tag stock web 18 enters the printing station, it will engage the leading cam edge 96 at the forward depending portion of the puller arm 88 and will thereby rock the puller arm upward to the latter's disabled position (FIG. 4), in which it is not coupled to the sub-platen 66 and the drive pin 112. Therefore, the sub-platen will be in its forward position and printing will occur on the tag stock. When the trailing end of the entire tag stock web being operated on moves across the printing station, as soon as that end moves leftwardly past the central depending lug 98 of the puller arm and into alignment with the puller arm cutout 100, the puller arm is thereby once again free to be spring-rocked downwardly to enabled position for subsequent rearward disabling movement of the sub-platen, as described above.

It should be noted that although not disclosed in U.S. Pat. No. 2,708,873, the commercialized version of that machine does have mounted on a shaft corresponding to the aforementioned shaft 90 forwardly extending, downwardly urged retainer members. These serve to hold the tag stock firmly in position against the underlying platen of the prior art machine. These retainer members are provided because the tag feed arms 22, 24 are disengaged from the tag web (by respective rearward and forward movement of the arms away from the web) just prior to printing. Such disengagement continues until after printing has occurred and the platen starts descending. This is done to avoid possible interference between the printing wheels and the tag feed arms. The previously described piror art tag retainer members serve to prevent any random unintended movement of the tag stock, and hold the stock in proper position while the feed arms are disengaged from the stock. The depending forward central steps or lugs 98 of the present puller arms 88 also perform this retaining or holding-down function for the tag stock. Of course, they also perform the new and unique function of disabling the sub-platens in the absence of tag stock at a printing station.

It should also be noted that the aforementioned U.S. Pat. No. 2,890,650, which discloses another version of a print-punch machine, does have provision for removing a platen from operative position if there is no tag stock at the web so that there will not be printing on the platen. However, as described therein (note column 10), such removal of the platen is a vertical movement, and further involves complex additional structure.

Ribbon Feed

In one application of the machine, the OCR characters to be printed are nominally 0.108 inches high. A ⅛-inch wide ribbon could be used but would be quite difficult to guide. Furthermore, using the hot printing technique the same portion of the ribbon cannot be used more than once.

In the present specific embodiment, a wide, approximately ½-inch width ribbon is used. It is fed along a first path across the printing stations, during which two lines of printing are printed at two of the stations. The ribbon is then fed in the opposite path across the printing stations. Printing is done on a third line of the ribbon at the third printing station.

The ribbon 58 is supplied from a reel 116 (FIGS. 1, 10) freely rotatably supported on a shaft 118 mounted on the machine's main left framing plate 120. The ribbon is fed up and to the rear over an anti-chafing sleeve of Teflon or the like on member 122, and turned 90° to the right around a bracket 124 fast with the platen carriage 20. The ribbon makes its horizontally extending first printing pass to the right across the printing stations, passes underneath a bracket 126 of the platen carriage, and then upwardly and around a roller 127 mounted on bracket 126, with a sufficient twist on either side of the latter to make a 180° turn. The ribbon then returns under bracket 126 to the left across the printing stations for its second printing pass forward of the first printing pass.

The ribbon continues on to the left where it is firmly gripped between a drive roller 128 fast on a shaft 130 rotatably supported on platen carriage 20, and a pinch roller 132 rotatably supported on a shaft 134. The latter shaft is carried by two opposed arms 136, 138 pivoted at their lower ends on platen carriage 20 and urged to the right by springs 140, 142 to cause pinch roller 132 to firmly hold the ribbon clamped against drive roller 128.

Drive roller 128 is cyclically driven to feed the ribbon to the left, by the leftward tag feeding movement of the forward feed arm 24. For this purpose, there is mounted at the left end of this feed arm a drive rack 144 meshable with an overlying pinion 146 fast on the drive roller shaft 130. Accordingly, during the leftward tag feeding movement of feed arm 24, rack 144 will drive pinion 146, and therefore drive roller 128, an angular amount sufficient to feed ribbon 58 one tag width. During the remainder of the cycle, the subsequent outward (forward) movement of feed arm 24 away from the tag stock 18 will carry rack 144 with it sideways out of mesh with the pinion. The feed arm and rack will then return to the right and then inwardly to complete the cycle. The next cyclic leftward tag feeding movement of feed arm 24 will carry rack 144 to the left to once again drive pinion 146 for ribbon feeding movement. The ribbon clamping force exerted by pinch roller 132 against drive roller 128 holds the latter in the angular position at which it stood when the rack previously moved sideways out of mesh with the pinion. Therefore, there will be no clashing of the gear teeth when the rack subsequently longitudinally re-engages the pinion on the next leftward movement of the feed arm and rack. The sideways disengagement of rack 144 from pinion 146 makes it unnecessary to provide for the customary, more complicated unidirectional type of drive mechanism such as a unidirectional clutch or a ratchet and pawl mechanism. The mounting of rack 144 to tag feed arm 24 is the screw and slot connection 148 shown in FIG. 10. This permits the left-right positioning of the rack to be adjusted, for varying the amount of ribbon feed in each cycle, and also to adjust the position of the rack for proper meshing with pinion 146 when the rack initially moves to the left in each stroke.

In the specific configuration of the machine shown in the present application, there are three printing stations, at which printing is respectively done on three separate lines of the tags as best seen in FIG. 7. The leftmost bank of printing wheels will print the middle line of printing 150 at the leftmost tag station, and the top line of printing 152 at the rightmost tag station; both from the rightwardly extending rear, first pass of printing ribbon 58 on upper and lower longitudinal portions thereof. Simultaneously, the lowermost line of printing 154 on the tags is printed at the middle printing station, on a central longitudinal portion of the ribbon. The forward, leftwardly running second pass of the ribbon used for the last described printing has already been printed from on its first, rightwardly running pass. However, since the latter printing was done on the two opposed outermost longitudinal portions of the ribbon, there still remains the unused central longitudinal ribbon portion for the lowermost tag line to be printed at the middle station. The encoded hole punching 30 has been performed on the tag stock before printing is performed. As described earlier, the punching station is to the right of the printing stations.

The number and fore-aft positioning of the lines of printing on the tag can be varied to suit the needs of any particular user by appropriately changing the number and fore-aft positions of the banks of printing wheels and correspondingly changing the ribbon paths.

Figure 12:
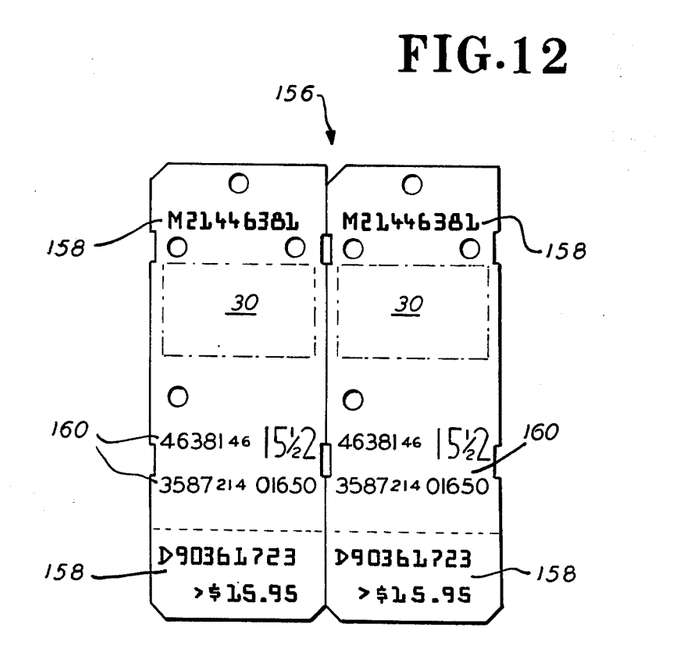
FIG. 12 shows a modified form of the tag, containing conventional printed information marked thereon as well as OCR printing and punched hole encoding.

If desired, the tag may also contain conventional, non-OCR printing as well as OCR printing. such a version is shown in FIG. 12, which depicts a two part tag although the tag may have a lesser or greater number of parts. The tag 156 contains the OCR printing 158 and the conventional printing 160, as well as the punching hole encoding 30. For printing this form of the tag, the banks of printing wheels in the machine for effecting the conventional printing 160 will of course have the conventional non-OCR printing type faces. The ink ribbon for performing the conventional printing may be either a heat activatable ribbon as for the OCR printing, or a conventional ribbon.

Figure 13:
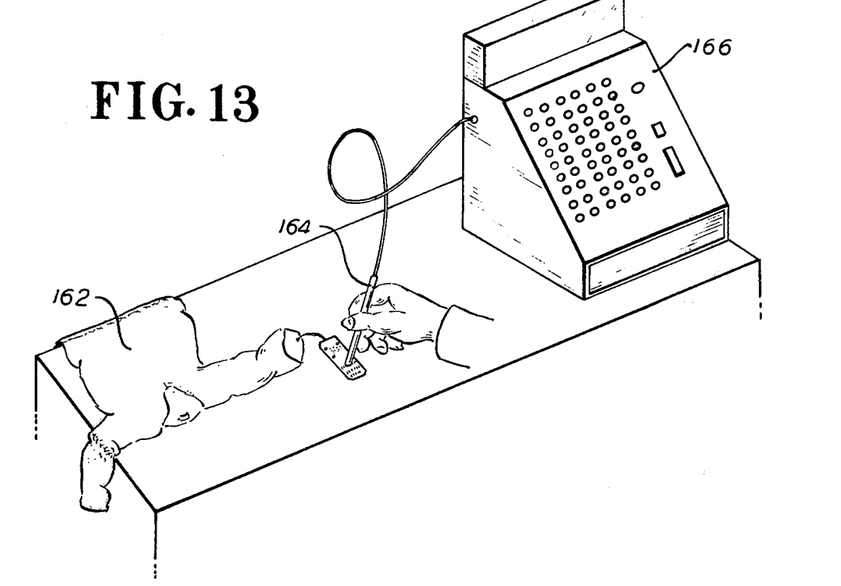
FIG. 13 is a perspective view showing a tag of the invention being read by a hand held OCR reader at a checkout counter in a store.

As shown in FIG. 13, the OCR-printed tags of the invention are attached to an article of merchandise 162. At the checkout counter in the store, the OCR printing is automatically read by a hand held OCR reader 164 which inputs the information read to a sales register 166. The tags may also be read by any suitable OCR batch reader, and can also be read by known punched hole readers effective to read the hole punchings 30.

It will of course be understood that the various principles and features of the invention, as defined in the following claims, are susceptible of numerous modifications and applications in many contexts and environments other than the specific machine disclosed herein. Accordingly, it should further be understood that the foregoing disclosure of a specific embodiment of the invention and in a particular machine, is intended to be illustrative and exemplary only, and in no way limitative of the following claims.

As used in the present specification and claims, the term "human readable characters" means and is limited to its usual meaning in the relevant arts, i.e., characters of the type which are ordinarily and customarily readable by human beings, as distinguished from characters which are recorded in an encoded manner so as not to be conventionally readable by human beings. An example of the latter type of encoded recording is optical bar coding as disclosed for example in the aforementioned Combs U.S. Pat. No. 3,726,212. The latter, bar type of coded recording is of course not ordinarily and customarily readable by human beings.

We claim:

1. A machine for printing on record materal human readable characters which are specially configured so as to also be capable of being read by character recognition apparatus, said machine comprising:

printing mechanism including printing means, said printing means comprising at least one printing wheel;

mounting means on which said printing wheel is rotatably mounted;

said printing wheel being provided on its rim with a plurality of different individual type faces each of which is specially configured to print a different one of said specially configured characters, any desired one of said type faces being selectable for printing;

means for selecting any desired one of said type faces for printing;

means for providing a supply of heat activatable printing ink means for said printing wheel;

means for heating said heat activatable ink means to enable said printing wheel to print said specially configured characters from said heat activatable ink means;

said heating means including said printing wheel and further including means for heating said printing wheel, said means for heartig said printing wheel including:
 a. said mounting means on which said printing wheel is rotatably mounted; and
 b. means for heating said mounting means.

2. The combination according to claim 1, wherein: said mounting means comprises hub means.

3. The combination according to claim 2, wherein: said means for heating said mounting means is disposed at least partially in said hub means.

4. The combination according to claim 3, wherein: said means for heating said mounting means comprises electric resistance heating means.

5. The combination according to claim 4, including: control means for controlling the temperature to which said electric resistance heating means heats said hub means.

6. The combination according to claim 5, wherein: said control means is adjustable to vary the temperature to which said electric resistance heating means heats said hub means.

7. The combination according to claim 1, wherein: said ink providing means comprises a foil ribbon.

8. The combination according to claim 1, wherein: said printing mechanism includes carriage means movable relativey towards and away from said printing wheel, and platen means carried by said carriage means and cooperable with said printing wheel to effect printing by relative movement of said carriage means towards said printing wheel.

9. The combination according to claim 8, said machine including:
 hole punching means for punching encoded arrangements of punched holes in said web;
 said hole punching means being operable by relative movement of said carriage towards said printing means.

10. The combination according to claim 1, wherein: said machine includes hole punching means for punching encoded arrangements of punched holes in said record material.

11. The combination according to claim 10, including:
 common means for differentially adjusting said printing wheel to select which of said type faces shall be effective to print, and for differentially adjusting said hole punching means to select the information to be punched thereby.

12. The combination according to claim 10, including:
 means defining a feed path along which said record material is fed in said machine;
 said printing means and said hole punching means being positioned at different stations along said feed path.

13. The combination according to claim 1, wherein: said characters are optical character recognition characters.

14. The combination according to claim 1, wherein: said selecting means comprises means for differentially rotating said printing wheel to select any desired one of said type faces for printing.

15. Th combination according to claim 1, wherein: said characters include the digits "0" through "9" inclusive.

16. A machine for printing on record material human readable characters which are specially configured so as to also be capable of being read by character recognition apparatus, said machine comprising:
 printing mechanism including printing means, said printing means comprising a bank of printing wheels;
 mounting means on which said printing wheels are rotatably mounted;
 each of said printing wheels being provided on its rim with a plurality of different individual type faces each of which is specially configured to print a different one of said specially configured characters, any desired one of said type faces of each printing wheel being selectable for printing;
 means for selecting any desired one of said type faces of each wheel for printing;
 means for providing a supply of heat activatable printing ink means for said printing wheels;
 means for heating said heat activatable ink means to enable said printing wheels to print said specially configured characters from said heat activatable ink means;
 said heating means including said printing wheels and further including means for heating said printing wheels, said means for heating said printing wheels including:
 a. said mounting means on which said printing wheels are rotatably mounted; and
 b. means for heating said mounting means.

17. The combination according to claim 16, wherein: said selecting means comprises means for differentially rotating each of said printing wheels to select for printing any desired one of said type faces of each wheel.

18. The combination according to claim 16, wherein: said characters include the digits 0 through 9 inclusive.

19. A machine for printing on record material human readable characters which are specially configured so as to also be capable of being read by character recognition apparatus, said machine comprising:
 printing mechanism, said printing mechanism including printing means;
 said printing means being provided with a plurality of type faces each specially configured to print different ones of said characters;
 means for providing a supply of heat activatable printing ink means for said printing means;
 means for heating said heat activatable ink means to enable said printing means to print said characters from said heat activatable ink means;
 hole punching means for punching encoded arrangements of punched holes in said record material;
 means defining a feed path along which said record material is fed in said machine;
 said printing means and said hole punching means being positioned at different stations along said feed path; and
 means for feeding said record material along said feed path to said different stations successively.

20. The combination according to claim 19, wherein: said printing means comprising several banks of printing members;
 each of said banks and said hole punching means all being positioned at different stations along said feed path;
 said feeding means being effective to feed said record material to said different stations successively.

* * * * *

UNITED STATES PATENT AND TRADEMARK OFFICE
CERTIFICATE OF CORRECTION

PATENT NO. : 4,023,482

DATED : May 17, 1977

INVENTOR(S) : Robert W. Swett, Amnon Goldstein, Edward C. Marshall, Paul E. Stanford It is certified that error appears in the above-identified patent and that said Letters Patent are hereby corrected as shown below:

Column 2, line 61, after "such as" insert --a--.

Column 7, line 5, after "latter" change "os" to --is--;

line 47, before "stock" change "tab" to --tag--.

Column 9, line 66, after "by" change "rerwardly" to --rearwardly--

Column 10, line 38, before "91" change "brcket" to --bracket--.

Column 11, line 48, before "tag" change "not" to --no--.

Column 12, line 15, before "art" change "piror" to --prior--.

Column 15, line 3, after "for" change "heartig" to --heating--;

line 28, after "movable" change "relativey" to --relatively--;

line 65, before "combination" change "Th" to --The--.

Signed and Sealed this twenty-third Day of August 1977

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION

Patent No. 4,023,482             Dated May 17, 1977

Inventor(s) Robert W. Swett et al.

It is certified that error appears in the above-identified patent and that said Letters Patent are hereby corrected as shown below:

Column 16, line 35, change "O" to -- "0" and "9" to -- "9" --.

Signed and Sealed this

*twenty-third* Day of *August 1977*

[SEAL]

*Attest:*

RUTH C. MASON
*Attesting Officer*

C. MARSHALL DANN
*Commissioner of Patents and Trademarks*